United States Patent [19]

Lundin et al.

[11] 4,260,917

[45] Apr. 7, 1981

[54] INTERCONNECTION FOR THE WINDINGS AND LEAD WIRES OF A MOTOR

[75] Inventors: Robert S. Lundin, Northfield; Randal B. Hathway, Thomaston, both of Conn.

[73] Assignee: The Superior Electric Company, Bristol, Conn.

[21] Appl. No.: 924,264

[22] Filed: Jul. 13, 1978

[51] Int. Cl.² ........................................... H02K 11/00
[52] U.S. Cl. ..................................... 310/71; 310/260
[58] Field of Search ................... 310/71, 42, 260, 258, 310/49, 179, 254, 89, 68 R, 43, 162, 163; 339/276 C, 174, 163 B; 174/72 A, 117 A

[56] References Cited

U.S. PATENT DOCUMENTS

| 2,688,103 | 8/1954 | Sheldon | 310/71 UX |
| 2,942,125 | 6/1960 | Schafer | 310/68 R |
| 2,982,872 | 5/1961 | Fredrickson | 310/49 R |
| 3,311,764 | 3/1967 | Linkous | 310/68 R |
| 3,423,612 | 1/1969 | Brundage | 310/68 R |
| 3,495,109 | 2/1970 | Ames | 310/71 |

Primary Examiner—R. Skudy

[57] ABSTRACT

Lead wires of a motor are stapled to a somewhat rigid, insulating disc to have their stripped ends be at selected points on the disc, the ends of the motor windings are placed in selected slots adjacent the stripped ends and wrapped thereabout and then soldered thereto to interconnect the winding ends with the appropriate lead wires, another insulating disc is positioned over the first and push nuts secure the assembly to the stator.

11 Claims, 7 Drawing Figures

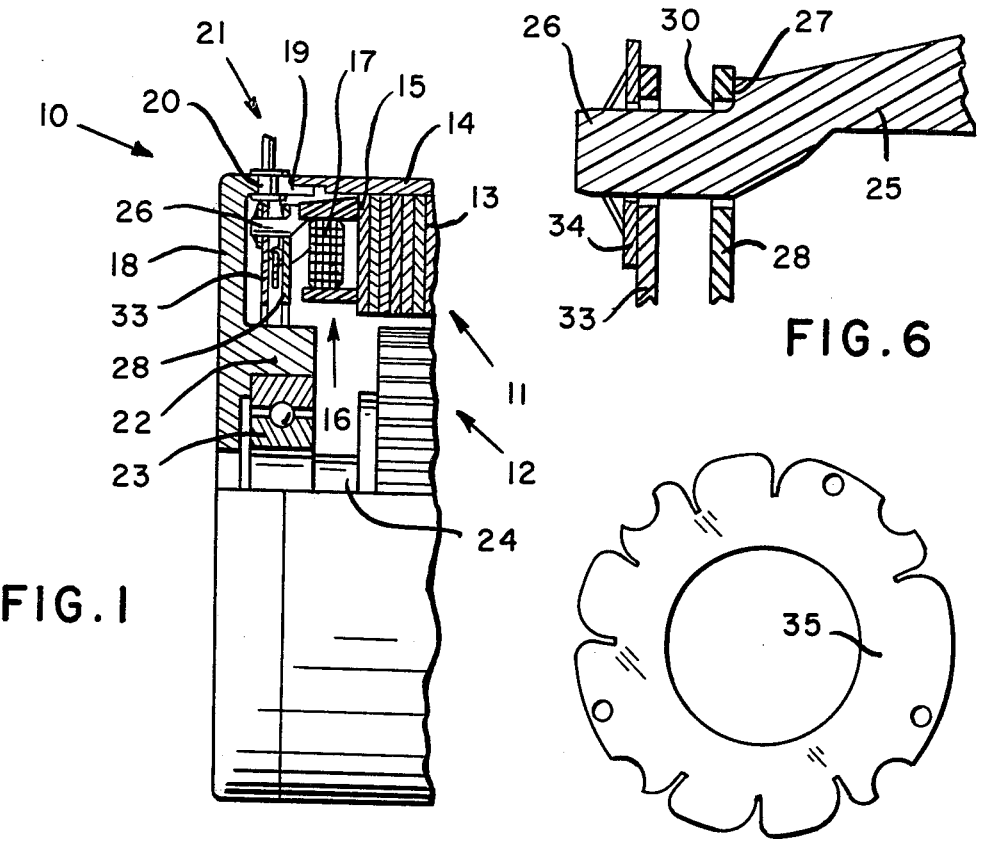
FIG. 1
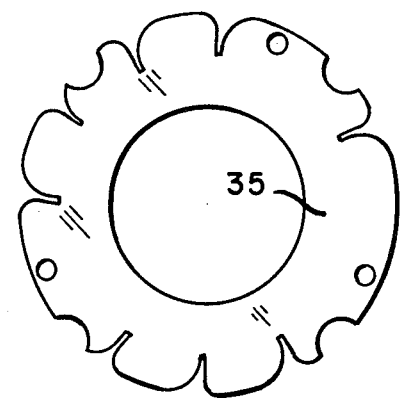
FIG. 6
FIG. 7
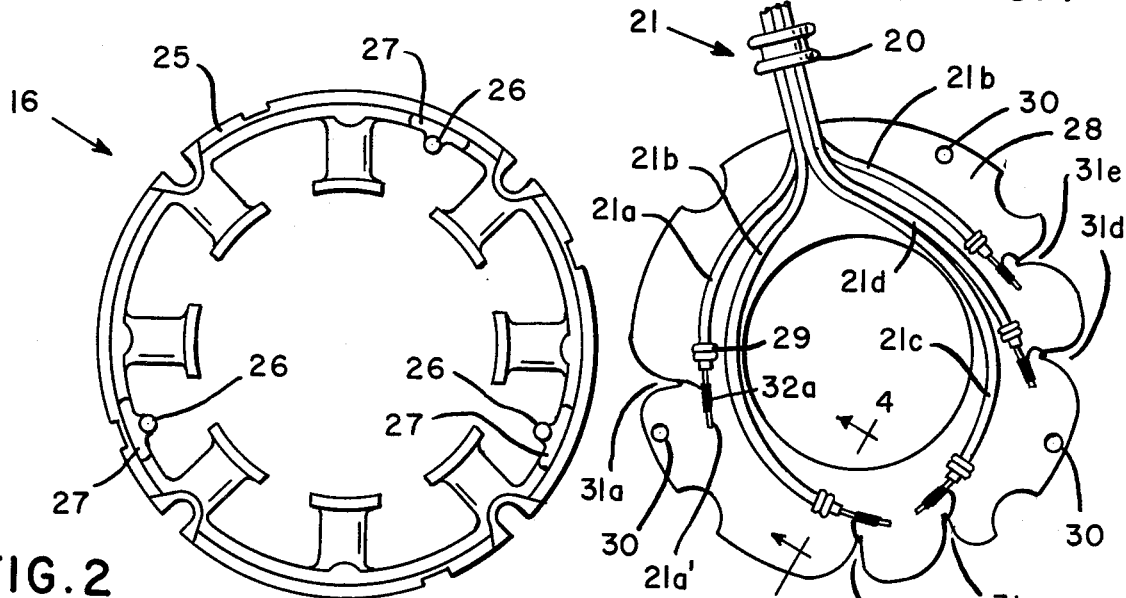
FIG. 2
FIG. 3
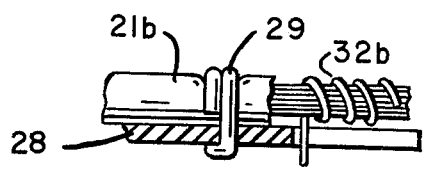
FIG. 5
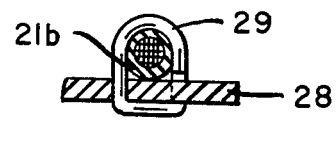
FIG. 4

INTERCONNECTION FOR THE WINDINGS AND LEAD WIRES OF A MOTOR

In U.S. Pat. No. 3,495,109, assigned to the assignee of the present invention, there is disclosed a stepping motor which utilizes a printed circuit board for connecting the ends of the windings to the lead wires that project from the motor and through which the motor is energized. As explained in said Patent, while the mechanical structure of the motor may remain essentially constant with the windings being wound about the inwardly directed poles thereof, the interconnection of the lead wires to the winding ends may vary with different motors depending upon the desired manner of energizing the motors. Thus, in some motors, it is required that the windings be interconnected for three leads, in others to five leads while in other motors six leads may be necessary and so forth. Thus, not only is there usually a relative large number of winding ends that must be connected to a large number of lead wires, at least for a stepping motor, the variety of interconnections for such motors enhances the possibility of error being introduced during manufacturing of the motor. Moreover, while the use of a printed circuit board has been found satisfactory, it has tended to be somewhat costly in relationship to its function and hence prevented its use in motors that are desired to be more economically manufactured.

It is accordingly an object of the present invention to provide an interconnection between the winding ends and the lead wires in an electric motor, which is usable with a plurality of different kinds of interconnections, facilitates the proper interconnections between the lead wires and the winding ends and which requires a minimal change in the structure of the motors.

Another object of the present invention is to achieve the above object in an extremely economical manner, both as to time and material, but yet in a manner which meets industry standards required for motor lead wires.

A further object of the present invention is to provide for the interconnection between the winding ends and lead wires which requires a minimum of special manufacturing equipment, is adaptable to different sized motors, may be used with different sizes of lead wires and/or winding wires and which is reliable and durable in use.

In carrying out the present invention, it is herein disclosed as applied to a stepping motor which has a stator stack formed with a planar end where the winding ends are located. The proper number of lead wires are stapled to a somewhat rigid, thin disc of electrically insulating material, to have the adjacent stripped end of each lead wire be at a specific location on the disc. The specific locations are selected to have each stripped end be positioned adjacent one of a plurality of peripherally spaced, inwardly directed slots formed in the disc. The lead wires are then grouped together by a rubber grommet to form a convenient, unitary assembly.

The assembly is positioned on posts that extend axially from a winding end form that is positioned against the planar end and each winding end is then inserted into its appropriate slot in the disc so as to be adjacent the stripped end to which it is to be connected. The electrical connection is completed by merely hand wrapping each winding end around the adjacent stripped end and then soldering the wrapped turns. Such a connection enables more than one winding end to be connected to a lead wire and assures that if a winding end is positioned in its designated slot, it is quite apt to be connected to the proper lead wire. The interconnection is completed by positioning another insulating disc on the posts and then forcing a push nut on each post to compact and secure the assembly. The soldered connections thus become sandwiched between the two insulating discs. The motor is completed by attaching an end bell to the stator with the lead wires projecting through an aperture formed in the end bell with the grommet being positioned in the aperture to maintain the lead wires insulated from the remainder of the stator.

Other features and advantages will hereinafter appear.

In the drawing

FIG. 1 is an elevation, partly in section, of the end portion of a stepping motor of the type in which the present invention is advantageously incorporated.

FIG. 2 is a plan of a winding end form.

FIG. 3 is a plan of an insulating disc having lead wires secured thereto.

FIG. 4 is a section taken on a line 4—4 of FIG. 3, somewhat enlarged.

FIG. 5 is a side sectional view of a connection between a lead wire and a winding end prior to soldering, also somewhat enlarged.

FIG. 6 is an enlarged detail, partly in section, showing the relative disposition of a post, insulating discs and push nut.

FIG. 7 is a plan of a further embodiment of a disc.

Referring to the drawing, the motor of the present invention is generally indicated by the reference numeral 10 and includes a stator 11 and a rotor 12. The stator includes a stator stack 13 consisting of a plurality of laminations and it is encircled by a cylindrical shell 14. The stack 13 has a planar end 15 against which is positioned a winding end form 16. Windings such as the winding 17, are wound about the stator stack and the end form. The stator further includes an end bell 18 formed with a U-shaped opening 19 in which is positioned a rubber grommet 20 with the grommet encircling a plurality of lead wires 21 that extend outwardly from the motor. The end bell 18 is formed with a hub 22 which supports a ball bearing 23, the latter serving to support one end of a shaft 24 of the rotor 12.

For a more detailed description of the above motor, reference is made to the above-noted U.S. Patent in which the specifically described motor has eight, inwardly directed poles, each of which has a winding 17 wound thereabout with the winding in some instances being bifilar to consist of two coils. While one form of motor is herein referred to, it will be understood that the present invention is usable with other kinds of electric motors and especially stepping motors whether of the variable reluctance or permanent magnet type in which there are a plurality of windings 17 which are interconnected to a plurality of lead wires 21.

Referring to FIG. 2, the end form 16 includes an outer rim 25 on which are formed three posts 26 that are positioned on the stator stack to extend toward the end bell 18. As shown, the posts 26 are asymetrically located with respect to each other. Further, each post extends from a ledge 27 that is nearer the end bell than the outermost surface of the winding 17.

Shown in FIG. 3 is a plan of a lead wire assembly which includes a flat disc 28 having the shape shown and formed from somewhat rigid, electrically insulating material such as a composition composed by nylon yarns and paper. One example of said material is sold under the registered Trademark "NOMEX" by DuPont. The disc may have a thickness of 0.020 inches which renders it quite mechanically stable. The lead wires 21 are individually indicated by reference characters 21a, 21b, 21c, 21d and 21e and each is covered by electrical insulation but has a stripped end, such as the end 21a' for the lead wire 21a. A staple 29 encircles the lead wire 21a adjacent its stripped end and projects through the disc 28 to secure the lead wire to the disc. Such a staple as shown is generally referred to as a "stitcher staple" and may be inserted by the use of an inverted head stitcher, available from the Bostitch Company, East Greenwich, R.I. The machine is adjusted such that the staple 29 somewhat indents the insulation so that an 8–10 lb. pull can be resisted without separating the lead wire from the staple attachment when the motor is completed.

Each of the lead wires, as shown, is secured to the disc in the same manner by a staple 29 located adjacent its stripped end. While only one staple has been shown, additional staples may be employed, if desired. However, there should be a staple adjacent the stripped end in order to maintain the stripped end at its desired location on the disc.

The disc 28 is formed with a plurality of apertures 30 which are asymetrically located so that the disc 30 may only fit on the posts 26 in one specific alignment. With such alignment, a slot, such as the slot 31a, which is formed to extend inwardly from the periphery of the disc is caused to be located at or near the position on the end form where the end or ends of the winding 17 that are desired to be connected to the lead wire 21a extend from the stator stack after forming the winding. In disc 28, five slots 31a–31e are formed with there being a slot for each lead wire 21. Further, the location of the slots is basically determined by where the winding ends project from the stator stack and the lead wires are positioned on the disc to have each stripped end be located adjacent the slot having the winding ends to which the lead wires are to be connected. Accordingly, when the disc 28 bearing lead wires 21 is positioned on the posts 26, there will be at least one winding end adjacent each of the slots and an operator may simply pull each wire into its slot. In some instances, as for example, slot 31c, two wire ends may be present for connection to the lead 21c.

The operator, after placing the winding end in its adjacent slot, then wraps a few turns of the winding end about the stripped end as for example, the turns 32a on the lead wire 21a. Similarly, each of the other winding ends is wrapped about the stripped end of the lead wire adjacent the slot through which each winding end projects. After the wrapping operation, surplus winding end wire is cut away and each of the joints is secured by a soldering operation that vaporizes the normal magnet wire insulation present on the winding end to thereby effect a satisfactory mechanical and electrical interconnection between the ends. The lead wires are then bunched and caused to extend through the rubber grommet 20 if the grommet had not previously been installed.

With the assembly as shown in FIG. 3 being positioned on the posts 26, another insulating disc 33 is then positioned on the posts. The disc 33 may be identical to the disc 28 or may be merely an annulus of electrical insulating material without the slots but with the asymetrical apertures 30. Subsequently, a push nut 34 is forced onto the protruding end of each post. Such a nut, in the forcing operation, pushes the disc 33 against the lead wires and also pushes the disc 28 against the ledge 27 to assure that the parts will be compactly positioned. One form of push nut that may be used is typically referred to as a "Tinnerman" nut. The motor is completed by securing the end bell 18 to the stator stack as, for example, by the use of through bolts with the grommet so being positioned in the U-shaped opening 19.

While the above description refers to a disc 28 which has the specific configuration for a five lead wire connection, if desired, a disc 35 having the shape shown in FIG. 7 may be employed in which there are eight slots which enables the disc to be used for a plurality of different number of lead wire connections. In this embodiment, as in the prior embodiment, each lead wire is stapled to have its stripped end be adjacent the slot through which the winding end or ends that are to be connected to the stripped end is located.

It will accordingly be understood that there has been disclosed an interconnection between the winding ends and the outwardly extending leads of an electric motor that is economical to fabricate and versatile in use. The interconnection employs a somewhat rigid, insulating disc formed with a plurality of slots with each winding end being positioned in a slot. Each lead wire is mechanically fastened on the disc at locations wherein the stripped end of each is positioned adjacent the slot having the winding end or ends to which it is to be connected. The ends are secured together by wrapping the winding end about the adjacent stripped end and soldering the connection.

Variations and modifications may be made within the scope of the claims and portions of the improvements may be used without others.

We claim:

1. An electric motor having a stator that includes a stator stack that is axially elongate and formed to have a plurality of inwardly directed poles with one end of said stack being essentially planar, winding means for magnetizing the poles and having a plurality of winding ends and a plurality of insulated lead wires extending from the motor with each lead wire having a stripped end within the motor, the improvement comprising a disc formed of electrically insulating material positioned adjacent the planar end of the stator and being formed to have a plurality of peripherally spaced, inwardly directed slots, each of the winding ends being positioned in its own selected slot to extend through the disc, means stapling each lead wire adjacent its stripped end onto the surface of the disc opposite the planar end of the stack, said stapling means positioning the stripped end of each lead wire adjacent a slot through which at least one winding end protrudes and means connecting each winding end to its adjacent stripped end including a plurality of turns of the winding end wrapped about the stripped end.

2. The invention as defined in claim 1 in which there is an end form of electrically insulating material positioned against a planar end of the stack and cooperating aligning means carried by the end form and disc.

3. The invention as defined in claim 2 in which the cooperating aligning means includes axially extending posts carried by the end form and holes formed in the disc through which the posts ends protrude, said posts and holes being asymetrically positioned.

4. The invention as defined in claim 3 in which there is a second disc formed of electrically insulating material positioned against the surface of the first disc, said second disc having holes through which the posts of the end form pass and fastening means secured on the end of each post that protrude beyond the second disc to sandwich the lead and winding ends between the two discs.

5. The invention as defined in claim 4 in which the fastening means consists of a push nut forced onto the protruding end of each post.

6. The invention as defined in claim 5 in which there are means formed on the end form adjacent each post for abutting the first mentioned disc to limit movement thereof towards the winding.

7. The invention as defined in claim 1 in which the connecting means further includes solder applied to the wrapped stripped ends.

8. The invention as defined in claim 1 in which the motor includes an end bell adjacent the planar end and in which there is another insulating disc positioned against the one surface to electrically insulate the connecting means from the end bell.

9. The invention as defined in claim 1 in which the motor is formed with an aperture through which the lead wires extend and in which an insulating grommet is positioned in the aperture with said grommet encircling the lead wires.

10. The invention as defined in claim 1 in which the number of slots at least equals the number of lead wires.

11. The invention as defined in claim 1 in which the number of slots is greater than the number of lead wires.

* * * * *